(12) United States Patent
Huh

(10) Patent No.: US 12,091,012 B2
(45) Date of Patent: **\*Sep. 17, 2024**

(54) METHOD AND DEVICE FOR CONTROLLING REGENERATIVE BRAKING OF HYBRID VEHICLE

(71) Applicants: Hyundai Motor Company, Seoul (KR); Kia Corporation, Seoul (KR)

(72) Inventor: Jeewook Huh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 238 days.

This patent is subject to a terminal disclaimer.

(21) Appl. No.: 17/844,836

(22) Filed: Jun. 21, 2022

(65) Prior Publication Data

US 2023/0150505 A1  May 18, 2023

(30) Foreign Application Priority Data

Nov. 18, 2021  (KR) .......................... 10-2021-0159340

(51) Int. Cl.
| | |
|---|---|
| *B60W 30/18* | (2012.01) |
| *B60W 10/02* | (2006.01) |
| *B60W 10/06* | (2006.01) |
| *B60W 10/08* | (2006.01) |
| *B60W 10/184* | (2012.01) |
| B60W 20/40 | (2016.01) |

(52) U.S. Cl.
CPC ...... *B60W 30/18127* (2013.01); *B60W 10/02* (2013.01); *B60W 10/06* (2013.01); *B60W 10/08* (2013.01); *B60W 10/184* (2013.01); *B60W 20/40* (2013.01); *B60W 2510/0657* (2013.01); *B60W 2510/083* (2013.01); *B60W 2540/12* (2013.01); *B60W 2710/0666* (2013.01)

(58) Field of Classification Search
CPC ..... B60W 30/18127; B60W 30/18136; B60W 10/02; B60W 10/06; B60W 10/08; B60W 10/184; B60W 10/18; B60W 20/40; B60W 20/00; B60W 2510/0657; B60W 2510/083; B60W 2540/12; B60W 2710/0666; B60W 2520/10; B60W 40/105; B60K 6/442; Y02T 10/62; B60L 7/10; B60T 7/042; F02N 11/0803; B60Y 2200/92
USPC .......................................................... 701/70
See application file for complete search history.

(56) References Cited

U.S. PATENT DOCUMENTS

| | | | | |
|---|---|---|---|---|
| 2022/0001748 A1* | 1/2022 | Huh | ................... | B60L 50/61 |
| 2023/0174068 A1* | 6/2023 | Huh | ................... | B60K 6/442 |
| | | | | 701/22 |

FOREIGN PATENT DOCUMENTS

| | | | | |
|---|---|---|---|---|
| JP | 4106835 | * | 6/2008 | ............ B60L 7/10 |
| JP | 2010155548 | * | 7/2010 | ............ B60W 10/18 |
| JP | 6247516 B2 | | 12/2017 | |
| JP | 2021-059129 A | | 4/2021 | |

(Continued)

*Primary Examiner* — Hai H Huynh
(74) *Attorney, Agent, or Firm* — Fox Rothschild LLP

(57) ABSTRACT

Disclosed is a method of controlling regenerative braking of a hybrid vehicle, and a device thereof. The method includes: controlling, by a controller, a hybrid vehicle to start a braking operation in response to a brake pedal operation signal; and after the braking operation of the hybrid vehicle is started, controlling, by the controller, a second motor that is connected to an input shaft of a transmission of the hybrid vehicle to perform regenerative braking.

8 Claims, 2 Drawing Sheets

(56) References Cited

FOREIGN PATENT DOCUMENTS

KR 101816479 B1 1/2018

\* cited by examiner

METHOD AND DEVICE FOR CONTROLLING REGENERATIVE BRAKING OF HYBRID VEHICLE

CROSS-REFERENCE TO RELATED APPLICATION

This application is based on claims the benefit of Korean Patent Application No. 10-2021-0159340 filed in the Korean Intellectual Property Office on Nov. 18, 2021, the entire contents of which are incorporated herein by reference.

TECHNICAL FIELD

Embodiments of the present disclosure relate to a vehicle, and more particularly, to a method and a device for controlling regenerative braking of a hybrid vehicle.

DESCRIPTION OF THE RELATED ART

In general, a hybrid vehicle, which is a kind of eco-friendly vehicle, is a vehicle that efficiently combines and uses two or more different types of power sources, and means a vehicle driven by an engine which combusts fuel to obtain rotational force and a motor which obtains rotational force from power of a battery.

The hybrid vehicle may be formed in various structures by using two or more power sources formed of the engine and the motor. The motor provided in the hybrid vehicle serves to assist the power of the engine during acceleration or hill driving.

A driving mode of the hybrid vehicle includes an Electric Vehicle (EV) mode, which is a pure electric vehicle mode that uses only motor power, a Hybrid Electric Vehicle (HEV) mode using the engine as the main power and using the motor as the auxiliary power, and a regenerative braking mode in which braking energy of the vehicle is collected through power generation in the motor and charged in the battery when the vehicle is driven by braking.

The regenerative braking is the technology in which electric energy is generated in a motor by applying reverse torque to an electric motor by using energy generated during braking in order to maximize fuel efficiency of an eco-friendly vehicle, the generated electric energy is stored in a high-voltage battery and is re-usable during the driving of the vehicle, and is applied to eco-friendly vehicles, such as a hybrid vehicle, an electric vehicle, or a fuel cell vehicle.

The regenerative braking is the technology for converting energy to electric energy during braking, and is directly connected with fuel efficiency, and the increase in the amount of regenerative braking means improvement of fuel efficiency. In the case of hybrid vehicles, compared to a general vehicle, regenerative braking plays a major role in improving fuel efficiency to the extent that regenerative braking exhibits most of the effect of improving fuel efficiency.

SUMMARY

Embodiments of the present disclosure have been made in an effort to provide a method and a device for controlling regenerative braking of a hybrid vehicle, which improve fuel efficiency of a hybrid vehicle by regenerative braking of motors included in the hybrid vehicle.

An exemplary embodiment of the present disclosure provides a method of controlling regenerative braking of a hybrid vehicle, the method including: controlling, by a controller, the hybrid vehicle to start a braking operation in response to a brake pedal operation signal; and after the braking operation of the hybrid vehicle is started, controlling, by the controller, a second motor that is connected to an input shaft of a transmission of the hybrid vehicle to perform regenerative braking.

The method may further include determining, by the controller, whether a speed of the hybrid vehicle is less than a vehicle speed reference value, in which when the speed of the hybrid vehicle is less than the vehicle speed reference value, the controller may control the second motor to perform the regenerative braking so that the amount of regenerative braking of the second motor is the amount of demanded braking of the hybrid vehicle corresponding to the brake pedal operation signal. In certain aspects, the speed of the hybrid vehicle may be determined to be at least 0.5, 1, 2, 3, 4, 5, 6, 7, 8, 9 or 10 kilometers per hour less than a vehicle speed reference value.

The method may further include, when the speed of the hybrid vehicle is equal to or greater than the vehicle speed reference value, determining, by the controller, whether the second motor generates the maximum amount of regenerative braking, and whether the maximum amount of regenerative braking of the second motor is less than the amount of demanded braking of the hybrid vehicle, in which when the second motor does not generate the maximum amount of regenerative braking, the controller may control the second motor to perform the regenerative braking so that the amount of regenerative braking of the second motor is the amount of demanded braking of the hybrid vehicle. In certain aspects, the speed of the hybrid vehicle may be determined to be at least 0.5, 1, 2, 3, 4, 5, 6, 7, 8, 9 or 10 kilometers per hour greater than a vehicle speed reference value.

The method may further include: when the second motor generates the maximum amount of regenerative braking and the maximum amount of regenerative braking of the second motor is less than the amount of demanded braking of the hybrid vehicle, engaging, by the controller, the engine clutch that connects or disconnects an engine and the second motor of the hybrid vehicle; after the engine clutch is engaged, calculating, by the controller, the amount of regenerative braking of the first motor that starts the engine based on the amount of demanded braking of the hybrid vehicle, friction force of the transmission, the maximum amount of regenerative braking of the second motor, and friction force of the engine; and controlling, by the controller, the first motor to perform the regenerative braking based on the amount of regenerative braking of the first motor.

Another exemplary embodiment of the present disclosure provides a device for controlling regenerative braking of a hybrid vehicle, the device including: a second motor connected to an input shaft of a transmission of the hybrid vehicle; and a controller configured to control the hybrid vehicle to start a braking operation in response to a brake pedal operation signal, in which after the braking operation of the hybrid vehicle is started, the controller may control the second motor to perform regenerative braking.

The controller may determine whether a speed of the hybrid vehicle is less than a vehicle speed reference value, and when the speed of the hybrid vehicle is less than the vehicle speed reference value, the controller may control the second motor to perform the regenerative braking so that the amount of regenerative braking of the second motor is the amount of demanded braking of the hybrid vehicle corresponding to the brake pedal operation signal. In certain aspects, the speed of the hybrid vehicle may be determined to be at least 0.5, 1, 2, 3, 4, 5, 6, 7, 8, 9 or 10 kilometers per hour less than a vehicle speed reference value.

When the speed of the hybrid vehicle is equal to or greater than the vehicle speed reference value, the controller may determine whether the second motor generates the maximum amount of regenerative braking, and whether the maximum amount of regenerative braking of the second motor is less than the amount of demanded braking of the hybrid vehicle, and when the second motor does not generate the maximum amount of regenerative braking, the controller may control the second motor to perform the regenerative braking so that the amount of regenerative braking of the second motor is the amount of demanded braking of the hybrid vehicle. In certain aspects, the speed of the hybrid vehicle may be determined to be at least 0.5, 1, 2, 3, 4, 5, 6, 7, 8, 9 or 10 kilometers per hour greater than a vehicle speed reference value.

The device may further include a first motor configured to start an engine of the hybrid vehicle, in which when the second motor generates the maximum amount of regenerative braking and the maximum amount of regenerative braking of the second motor is less than the amount of demanded braking of the hybrid vehicle, the controller may engage an engine clutch that connects or disconnects the engine and the second motor, and after the engine clutch is engaged, the controller may calculate the amount of regenerative braking of the first motor based on the amount of demanded braking of the hybrid vehicle, friction force of the transmission, the maximum amount of regenerative braking of the second motor, and friction force of the engine, and the controller may control the first motor to perform the regenerative braking based on the amount of regenerative braking of the first motor.

The method and the device for controlling regenerative braking of the hybrid vehicle according to the exemplary embodiments of the present disclosure may improve fuel efficiency of a hybrid vehicle by regenerative braking of the motors included in the hybrid vehicle.

As discussed, the method and system suitably include use of a controller or processer.

In another aspect, vehicles are provided that comprise an apparatus as disclosed herein.

BRIEF DESCRIPTION OF THE DRAWINGS

In order to help more full understanding of the drawings used in the detailed description of embodiments of the present disclosure, a brief description of each drawing is provided.

DETAILED DESCRIPTION OF THE EMBODIMENTS

Figure 1:
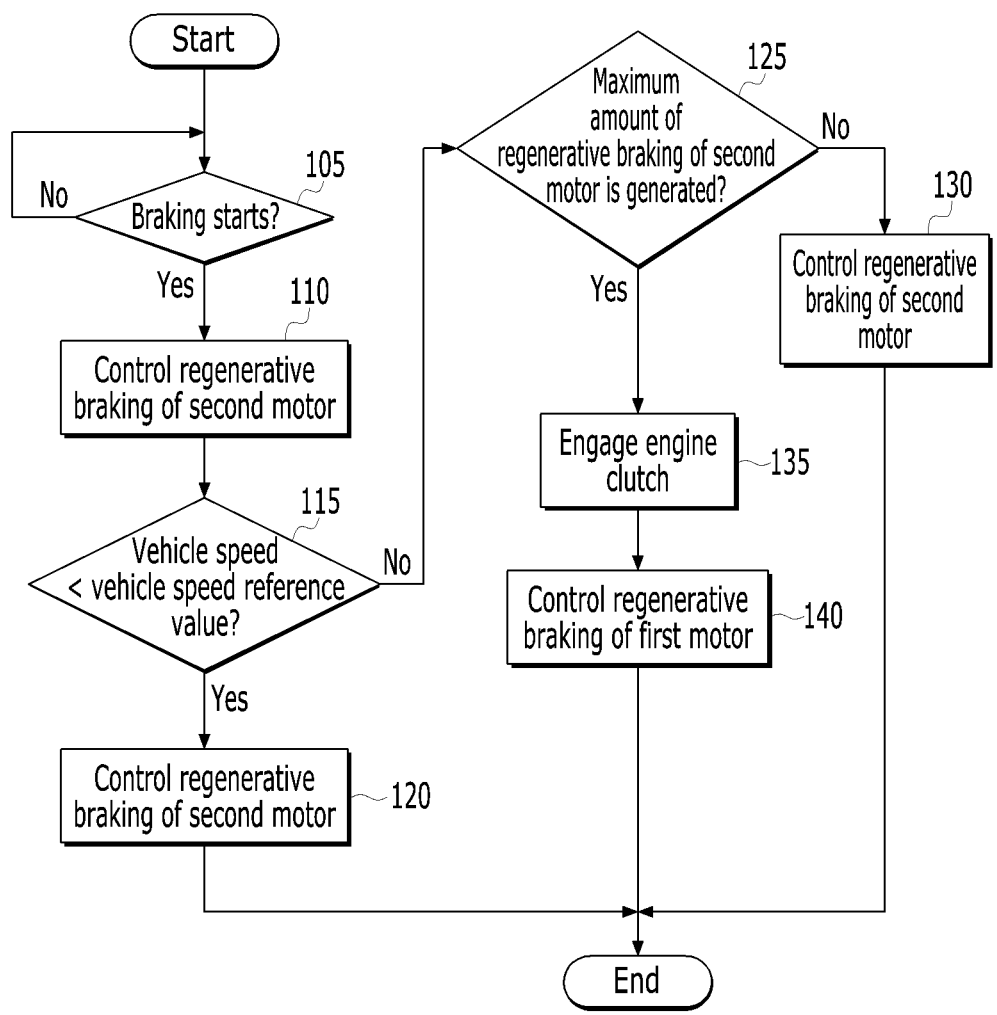
FIG. 1 is a flowchart for describing a method of controlling regenerative braking of a hybrid vehicle according to an exemplary embodiment of the present disclosure.

In order to fully understand the present disclosure and the object achieved by the implementation of the present disclosure, reference should be made to the accompanying drawings illustrating the exemplary embodiment of the present disclosure and the contents described in the accompanying drawings.

Hereinafter, the present disclosure will be described in detail by describing the exemplary embodiment of the present disclosure with reference to the accompanying drawings. In the following description of the exemplary embodiment, a detailed description of known configurations or functions incorporated herein will be omitted when it is judged that the detailed description may make the subject matter of the present disclosure unclear. Like reference numerals presented in each drawing designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The term used in the present specification is simply used for describing a specific embodiment and does not intend to limit the present disclosure. A singular expression includes a plural expression unless it is specifically described to the contrary in the context. In the present specification, it should be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Throughout this specification, when it is described that an element is "coupled" to another element, the element may be "directly coupled" to the another element or "electrically or mechanically coupled" to the another element a still another element interposed therebetween.

All terms used herein including technical or scientific terms have the same meanings as meanings which are generally understood by those skilled in the art to which the present disclosure pertains unless they are differently defined. Terms defined in generally used dictionary shall be construed to have meanings matching those in the context of a related art and shall not be construed as ideal or excessively formal meanings unless they are clearly defined in the present application.

Figure 2:
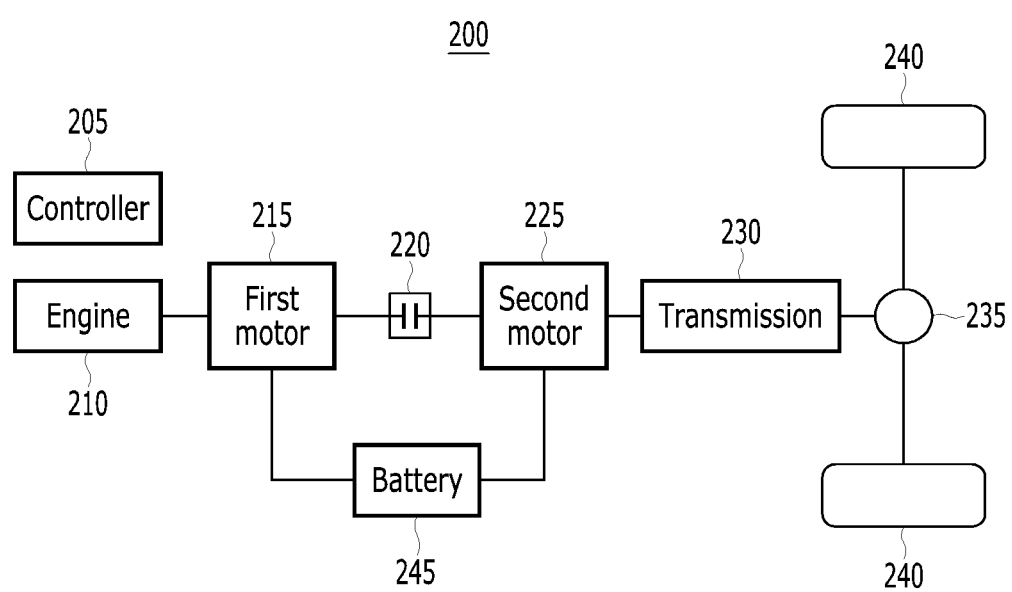
FIG. 2 is a block diagram illustrating a device for controlling regenerative braking of a hybrid vehicle to which the method of controlling regenerative braking of the hybrid vehicle illustrated in FIG. 1 is applied.

FIG. 1 is a flowchart for describing a method of controlling regenerative braking of a hybrid vehicle according to an exemplary embodiment of the present disclosure. FIG. 2 is a block diagram illustrating a device for controlling regenerative braking of a hybrid vehicle to which the method of controlling regenerative braking of the hybrid vehicle illustrated in FIG. 1 is applied.

Referring to FIGS. 1 and 2, in a determination operation 105, a controller 205 may control a hybrid vehicle 200 to start a braking operation in response to a brake pedal operation signal. The brake pedal operation signal may be generated when a driver of the hybrid vehicle 200 depresses the brake pedal of the hybrid vehicle.

As illustrated in FIG. 2, the hybrid vehicle 200 may include the controller 205, an engine 210, a first motor 215, an engine clutch 220, a second motor 225, a transmission 230, a final reduction gear device 235 that is a decelerator, driving wheels 240, and a battery 245. The device for controlling regenerative braking of the hybrid vehicle may include the controller 205, the first motor 215, and the second motor 225.

The controller 205 may control the overall operation of the hybrid vehicle 200 as an electronic control unit (ECU). For example, the controller 205 may be one or more microprocessors operated by a program (control logic) or hardware (for example, a microcomputer) including the microprocessor, and the program may include a series of instructions for performing the method of controlling regenerative braking of the hybrid vehicle according to the exemplary embodiment of the present disclosure. The instruction may be stored in a memory of the hybrid vehicle 200.

The controller 205 may include a hybrid control unit (HCU), a motor control unit (MCU), an engine control unit (ECU), and a transmission control unit (TCU).

The hybrid vehicle 200 is a hybrid electric vehicle, and may use the engine 210 and the second motor 225 as power sources, and the engine clutch 220 is present between the second motor 225 and the engine 210, so that the vehicle is operated in an Electric Vehicle (EV) mode in which the vehicle travels by the second motor 225 in the state where the engine clutch 220 is opened, and the vehicle is operated in a Hybrid Electric Vehicle (HEV) mode in which the vehicle is capable of travelling by both the engine 210 and the second motor 225 in the state where the engine clutch 220 is closed.

The first motor 215 is operated as an electric motor or a generator, and the first motor 215 may be operated as an electric motor according to a control signal output from the controller 205 to start the engine 210 and is operated as a generator in the state where the starting of the engine 210 is maintained to generate voltage and provide the generated voltage to the battery 245 as charging voltage. The first motor 215 may be operated as a generator in regenerative braking to supply regenerative energy to the battery 245. The first motor 215 may be installed (disposed) between the engine 210 and the engine clutch 220, and may also be mentioned as a P1 motor.

The second motor 225 is a driving motor and is connected to an input shaft of the transmission 230, and may also be mentioned as a P2 motor. The second motor 225 may be installed (disposed) between the engine clutch 220 and the transmission 230. The second motor 225 may be operated as a generator in coasting drive or regenerative braking to supply regenerative energy to the battery 245.

The battery 245 is formed of a plurality of unit cells, and for example, a high direct-current voltage of 260 Volt to 450 V may be stored in the battery 245 for providing a voltage to the first motor 215 or the second motor 225.

According to an operation 110 illustrated in FIG. 1, after the braking operation of the hybrid vehicle 200 starts, the controller 205 may control the second motor 225 connected to the input shaft of the transmission 230 of the hybrid vehicle to first perform regenerative braking. The second motor 225 is connected to the driving wheel 240 through the transmission 230, so that a regenerative braking loss of the second motor 225 may be smaller than a regenerative braking loss of the first motor 215. For instance, in certain aspects, the regenerative braking loss of the second motor 225 may be about at least 1, 2, 3, 4, 5, 6, 7, 8, 9, 10, 15, 20 or 25 percent less than a regenerative braking loss of the first motor 215. Therefore, regenerative braking efficiency of the second motor 225 is larger than regenerative braking efficiency of the first motor 215, so that the controller 205 may control the second motor 225 to first perform the regenerative braking.

The regenerative braking may be performed by the driving wheels 240, the final reduction gear device 235, the transmission 230, the first motor 215, and the battery 245.

According to an operation 115, after the operation 110, the controller 205 may determine whether a speed of the hybrid vehicle 200 is less than a vehicle speed reference value. The vehicle speed reference value may be determined by a test (or experiment), or determined by other selection.

When the speed of the hybrid vehicle 200 is less than the vehicle speed reference value, the method of controlling regenerative braking of the hybrid vehicle performs an operation 120, and when the speed of the hybrid vehicle 200 is equal to or greater than the vehicle speed reference value, the method of controlling regenerative braking of the hybrid vehicle performs an operation 125.

According to the operation 120, the controller 205 may control the second motor 225 to perform the regenerative braking so that the amount of regenerative braking of the second motor 225 is the amount of demanded braking of the hybrid vehicle 200 corresponding to the brake pedal operation signal.

According to the operation 125, the controller 205 may determine whether the second motor 225 generates the maximum amount of regenerative braking. Further, the controller 205 may determine whether the maximum amount of regenerative braking of the second motor 225 is less than the amount of demanded braking of the hybrid vehicle 200 corresponding to the brake pedal operation signal. The maximum amount of regenerative braking of the second motor 225 may be determined by an output (capacity or output capacity) of the second motor.

When the second motor 225 generates the maximum amount of regenerative braking and the maximum amount of regenerative braking of the second motor 225 is less than the amount of demanded braking of the hybrid vehicle 200, the process of the method of controlling regenerative braking of the hybrid vehicle may perform an operation 135, and when the second motor 225 does not generate the maximum amount of regenerative braking, the process of the method of controlling regenerative braking of the hybrid vehicle may perform an operation 130.

According to the operation 130, the controller 205 may control the second motor 225 to perform the regenerative braking so that the amount of regenerative braking of the second motor 225 is the amount of demanded braking of the hybrid vehicle 200 corresponding to the brake pedal operation signal.

According to the operation 135, the controller 205 may engage the engine clutch 220 that connects or disconnects the engine 210 and the second motor 225. In another exemplary embodiment of the present disclosure, before the engine clutch 220 is engaged, the controller 205 may control the speed of the engine to be the same as the speed of the second motor 225 by operating the engine 210 to control the fuel not to be supplied to the engine.

According to an operation 140, after the engine clutch 220 is engaged, the controller 205 may calculate the amount of regenerative braking of the first motor 215 based on the amount of demanded braking of the hybrid vehicle 200 corresponding to the brake pedal operation signal, friction force (or the amount of friction) of the transmission 230, the maximum amount of regenerative braking of the second motor 225, and friction force (or the amount of friction) of the engine 210. For example, the controller 205 may calculate the amount of regenerative braking of the first motor 215 by subtracting the friction force of the transmission 230, the maximum amount of regenerative braking of the second motor 225, and the friction force of the engine 210 from the amount of demanded braking of the hybrid vehicle 200. The controller 205 may control the first motor 215 to perform the regenerative braking based on the amount of regenerative braking of the first motor 215. The regenerative braking may be performed by the driving wheels 240, the final reduction gear device 235, the transmission 230, the engine clutch 220, the engine 210, the first motor 215, and the battery 245.

The constituent element, "~ unit", a block, or a module used in the exemplary embodiment of the present disclosure may be implemented by software, such as a task, class, subroutine, process, object, execution thread, and program performed in a predetermined area of a memory, or hardware, such as field-programmable gate array (FPGA) or an application-specific integrated circuit (ASIC), and may also be implemented by a combination of the software and the hardware. The constituent element, "~ unit" or the like may also be included in a computer readable storage medium, and a part thereof may be distributed in the plurality of computers.

As described above, the exemplary embodiments have been disclosed in the drawings and the specification. The specific terms are used herein but are only used for the purpose of describing the present disclosure and are not used to limit the meaning or the scope of the present disclosure described in the claims. Accordingly, those skilled in the art will appreciate that various modifications and equivalent embodiments may be made without departing from the scope and spirit of the present disclosure. Therefore, the true technical protection scope of the present disclosure will be defined by the technical spirit of the accompanying claims.

What is claimed is:

1. A method of controlling regenerative braking of a hybrid vehicle comprising a first motor configured to start an engine of the hybrid vehicle, the method comprising:
   controlling, by a controller, the hybrid vehicle to start a braking operation in response to a brake pedal operation signal; and
   after the braking operation of the hybrid vehicle is started, controlling, by the controller, a second motor that is connected to an input shaft of a transmission of the hybrid vehicle to perform regenerative braking.

2. The method of claim 1, further comprising:
   determining, by the controller, whether a speed of the hybrid vehicle is less than a vehicle speed reference value,
   wherein when the speed of the hybrid vehicle is less than the vehicle speed reference value, the controller controls the second motor to perform the regenerative braking so that an amount of regenerative braking of the second motor is an amount of demanded braking of the hybrid vehicle corresponding to the brake pedal operation signal.

3. The method of claim 2, further comprising:
   when the speed of the hybrid vehicle is equal to or greater than the vehicle speed reference value, determining, by the controller, whether the second motor generates the maximum amount of regenerative braking, and whether the maximum amount of regenerative braking of the second motor is less than the amount of demanded braking of the hybrid vehicle,
   wherein when the second motor does not generate the maximum amount of regenerative braking, the controller controls the second motor to perform the regenerative braking so that the amount of regenerative braking of the second motor is the amount of demanded braking of the hybrid vehicle.

4. The method of claim 3, further comprising:
   when the second motor generates the maximum amount of regenerative braking and the maximum amount of regenerative braking of the second motor is less than the amount of demanded braking of the hybrid vehicle, engaging, by the controller, the engine clutch that connects or disconnects an engine and the second motor of the hybrid vehicle;
   after the engine clutch is engaged, calculating, by the controller, an amount of regenerative braking of the first motor that starts the engine based on the amount of demanded braking of the hybrid vehicle, friction force of the transmission, the maximum amount of regenerative braking of the second motor, and friction force of the engine; and controlling, by the controller, the first motor to perform the regenerative braking based on the amount of regenerative braking of the first motor.

5. A device for controlling regenerative braking of a hybrid vehicle, the device comprising:
- a first motor configured to start an engine of the hybrid vehicle;
- a second motor connected to an input shaft of a transmission of the hybrid vehicle; and
- a controller configured to control the hybrid vehicle to start a braking operation in response to a brake pedal operation signal,
- wherein after the braking operation of the hybrid vehicle is started, the controller controls the second motor to perform regenerative braking.

6. The device of claim 5, wherein:
the controller determines whether a speed of the hybrid vehicle is less than a vehicle speed reference value, and
when the speed of the hybrid vehicle is less than the vehicle speed reference value, the controller controls the second motor to perform the regenerative braking so that an amount of regenerative braking of the second motor is an amount of demanded braking of the hybrid vehicle corresponding to the brake pedal operation signal.

7. The device of claim 6, wherein:
when the speed of the hybrid vehicle is equal to or greater than the vehicle speed reference value, the controller determines whether the second motor generates the maximum amount of regenerative braking, and whether the maximum amount of regenerative braking of the second motor is less than the amount of demanded braking of the hybrid vehicle, and
when the second motor does not generate the maximum amount of regenerative braking, the controller controls the second motor to perform the regenerative braking so that the amount of regenerative braking of the second motor is the amount of demanded braking of the hybrid vehicle.

8. The device of claim 7, further comprising:
a first motor configured to start an engine of the hybrid vehicle,
wherein when the second motor generates the maximum amount of regenerative braking and the maximum amount of regenerative braking of the second motor is less than the amount of demanded braking of the hybrid vehicle, the controller engages an engine clutch that connects or disconnects the engine and the second motor, and
wherein after the engine clutch is engaged, the controller calculates an amount of regenerative braking of the first motor based on the amount of demanded braking of the hybrid vehicle, friction force of the transmission, the maximum amount of regenerative braking of the second motor, and friction force of the engine, and
wherein the controller controls the first motor to perform the regenerative braking based on the amount of regenerative braking of the first motor.

* * * * *